United States Patent
Osterholt et al.

(10) Patent No.: US 12,072,268 B2
(45) Date of Patent: Aug. 27, 2024

(54) AUTOMATIC DETERMINATION OF TRIGGER ANGLE FOR RECIPROCATING COMPRESSOR ROD DROP MEASUREMENTS

(71) Applicant: epro GmbH, Gronau (DE)

(72) Inventors: Michael Osterholt, Südlohn (DE);
Thomas Wewers, Stadtlohn (DE);
Tomasz Lech, Walbrzych (PL)

(73) Assignee: epro GmbH, Gronau (DE)

( * ) Notice: Subject to any disclaimer, the term of this patent is extended or adjusted under 35 U.S.C. 154(b) by 441 days.

(21) Appl. No.: 17/496,117

(22) Filed: Oct. 7, 2021

(65) Prior Publication Data
US 2023/0113754 A1    Apr. 13, 2023

(51) Int. Cl.
- *G01M 99/00* (2011.01)
- *F04B 51/00* (2006.01)
- *F04B 53/14* (2006.01)
- *G01B 7/00* (2006.01)

(52) U.S. Cl.
CPC ........... *G01M 99/005* (2013.01); *F04B 51/00* (2013.01); *F04B 53/144* (2013.01); *G01B 7/003* (2013.01); *F04B 2201/0201* (2013.01); *F04B 2201/021* (2013.01)

(58) Field of Classification Search
CPC ..... G01M 99/005; F04B 51/00; F04B 53/144; F04B 2201/0201; F04B 2201/021; F04B 2201/0205; F04B 39/0022; F04B 49/065; F04B 53/14; G01B 7/003
See application file for complete search history.

(56) References Cited

U.S. PATENT DOCUMENTS

| | | | |
|---|---|---|---|
| 3,921,610 A | 11/1975 | Hartig | |
| 4,456,963 A * | 6/1984 | Wiggins | G01M 15/08 73/114.14 |
| 4,501,248 A | 2/1985 | Eisele et al. | |
| 6,155,109 A | 12/2000 | Supak | |
| 8,933,691 B2 | 1/2015 | Galka et al. | |

(Continued)

FOREIGN PATENT DOCUMENTS

| | | |
|---|---|---|
| AT | 405981 B | 1/2000 |
| DE | 4134589 C2 | 1/1995 |

(Continued)

*Primary Examiner* — Peter J Macchiarolo
*Assistant Examiner* — John M Royston
(74) *Attorney, Agent, or Firm* — Luedeka Neely, P.C.

(57) ABSTRACT

A machine monitoring system automatically determines an optimal trigger angle for monitoring the rod drop of a reciprocating compressor, and sets the trigger angle configuration value accordingly. A key pulse is monitored using a key phase sensor, the amplitude of the rod drop transducer voltage versus time (or rotation angle) is analyzed, and a position of the minimal change in slope of the rod drop transducer voltage signal relative to the key mark is determined. The optimal trigger angle is determined based on this temporal position, the current speed and the configured piston angle. The optimal trigger angle is provided to the machine monitoring system for configuration. The system thereby relieves the service engineer from having to test several trigger angles with manually-operated test instruments to determine the optimal trigger angle.

12 Claims, 5 Drawing Sheets

(56) References Cited

U.S. PATENT DOCUMENTS

| | | | |
|---|---|---|---|
| 9,435,277 B2 | 9/2016 | Garrard et al. | |
| 2005/0069417 A1* | 3/2005 | Kim | F04B 35/045 |
| | | | 417/1 |
| 2016/0090980 A1* | 3/2016 | Howard | F04B 39/0005 |
| | | | 417/63 |
| 2017/0045420 A1* | 2/2017 | Leatham | G05B 23/0256 |
| 2018/0283368 A1 | 10/2018 | Cotte et al. | |

FOREIGN PATENT DOCUMENTS

| | | |
|---|---|---|
| DE | 102006033062 A1 | 1/2008 |
| DE | 102015009678 A1 | 1/2016 |
| DE | 102017217438 A1 | 4/2018 |
| EP | 2012013 B1 | 3/2011 |

* cited by examiner

AUTOMATIC DETERMINATION OF TRIGGER ANGLE FOR RECIPROCATING COMPRESSOR ROD DROP MEASUREMENTS

FIELD

This invention relates to the field of online machinery protection systems. More particularly, this invention relates to a machine monitoring system that automatically determines an optimal trigger angle for monitoring industrial reciprocating compressors and sets an appropriate configuration value accordingly.

BACKGROUND

According to API Standard 670 for machinery protection systems, most horizontal reciprocating compressors rely on piston rider bands to support the piston and prevent contact with the cylinder liner. As these bands wear, the piston rod drops in the cylinder and moves in the rod packing by a corresponding amount. Monitoring the amount of rod drop is a way to sense the amount of wear of the piston rider bands.

Monitoring systems for machinery protection typically monitor rod drop in reciprocating compressors using two modes: average mode and triggered mode. The average mode calculates a measured value based on the average value of many sample values throughout a piston stroke. The triggered mode uses just one value at a specified position of the piston rod. That position is determined by two angular degree values that must be configured for the monitoring system: piston angle and trigger angle.

As depicted in FIG. 1, the piston angle is the number of degrees between the key trigger mark on the flywheel and the phase reference transducer when the piston is at the top dead center (TDC) position. The piston angle can be directly measured at the reciprocating compressor, and in some cases can be read from the compressor's technical data in the manufacturer operation manual.

The trigger angle—also depicted in FIG. 1—has conventionally been determined and set based on field testing on the machine. According to API 670: "To use the triggered mode properly, find a point on the stroke where the gap voltage changes due to all influences other than rider band wear are minimized. This must be done through field testing during commissioning of the piston rod drop monitor." Typically, the service engineer must test several trigger angle values to find the correct trigger angle for the specific reciprocating compressor. This testing requires the use of various manually-operated measurement tools (oscilloscope, voltage meter, revolution counter etc.) to calculate the trigger angle from the voltage output of the rod drop transducer and the speed of the machine. This testing and calculation require a significant amount of expertise and is prone to errors.

What is needed, therefore, is an apparatus and method for automatically determining the optimal trigger angle of a rotating machine, such as a reciprocating compressor, without the use of manually-operated measurement tools.

SUMMARY

The above and other needs are met by a machine monitoring system that automatically determines the optimal trigger angle on demand and sets the appropriate configuration value accordingly. This relieves the service engineer from having to test several trigger angles with manually-operated test instruments to determine the correct trigger angle. The service engineer can simply verify the determined configuration setting and reconfigure the machine monitoring system with the new trigger angle, or can accept an automatic entry for the trigger angle into the configuration settings.

In preferred embodiments, the machine monitoring system determines the trigger angle on demand only when the reciprocating compressor is running in a stationary working mode. A key pulse is calculated by a speed/key monitor of the machine monitoring system based on a key phase sensor of the reciprocating compressor. Depending on the key pulse and the speed of the machine, the amplitude of the rod drop transducer voltage versus time (or rotation angle) is examined, and a temporal position referring to the key mark of the minimal change in slope of the rod drop transducer voltage signal is determined. Starting from this temporal position, the optimal trigger angle is determined based on the current speed and the configured piston angle. This optimal trigger angle is provided to the machine monitoring system for configuration.

Some preferred embodiments are directed to a machine monitoring system for acquiring information regarding operation of a machine having a piston rod and a rotating component to which the piston rod is connected. The system includes a rod position sensor mounted adjacent to the piston rod and a rod position monitor circuit in communication with the rod position sensor. The rod position sensor generates a rod position voltage signal indicative of the proximity of the piston rod relative to the rod position sensor during operation of the machine. The rod position monitor circuit includes one or more analog-to-digital converters for sampling the rod position voltage signal and for converting the rod position voltage signal to digital rod position data. The rod position monitor circuit also includes a processor operable to execute operational instructions for processing the digital rod position data. The operational instructions include instructions that:

determine a rotational speed of the rotating component of the machine;

detect a full rotation of the rotating component of the machine;

determine a plurality of slope values of the rod position voltage signal based on the digital rod position data, wherein the slope values are calculated on a sample-by-sample basis during the full rotation of the rotating component, each slope value indicating a slope of the rod position voltage signal between adjacent data samples;

within the plurality of slope values, find multiple ranges of consecutive slope values in which each slope value is within a predetermined amplitude range about zero slope;

determine a widest range of consecutive slope values within the multiple ranges, wherein the widest range has a largest number of consecutive slope values;

determine a rotation angle of the rotating component corresponding to the widest range; and calculate a trigger angle based on the rotation angle according to:

trigger angle=rotation angle+piston angle, wherein the piston angle is a predetermined stored value; and The system includes memory for storing a trigger angle configuration value corresponding to the trigger angle calculated by the processor.

In some embodiments, the processor determines a midpoint within the widest range, and determines the rotation angle corresponding to the midpoint.

In some embodiments, the widest range of consecutive slope values has a start slope value and an end slope value, wherein the start slope value corresponds to a start angle or a start time, wherein the end slope value corresponds to an end angle or an end time, and wherein the rotation angle determined by the processor corresponds to a midpoint angle between the start angle and the end angle, or corresponds to a midpoint time between the start time and the end time.

In some embodiments, after calculating the trigger angle, the processor continuously monitors rod drop of the piston rod in a triggered mode based on a rod position voltage determined at the calculated trigger angle.

In some embodiments, the machine monitoring system includes a display device and an input device. The display device displays the calculated trigger angle for viewing by a user. The input device receives input from the user to select the trigger angle configuration value corresponding to the trigger angle calculated by the processor, or to select a predetermined trigger angle configuration value stored in the memory.

In some embodiments, the rod position sensor comprises a proximity transducer mounted adjacent to the piston rod.

In some embodiments, the machine monitoring system includes a key phase sensor mounted in proximity to the rotating component for generating a key phase voltage signal having pulses corresponding to rotations of the rotating component.

In another aspect, the invention provides a method for acquiring information regarding operation of a machine having a piston rod and a rotating component to which the piston rod is connected. The method includes:

(a) generating a rod position voltage signal using a rod position sensor mounted adjacent to the piston rod, wherein the rod position voltage signal is indicative of proximity of the piston rod relative to the rod position sensor during operation of the machine;

(b) sampling the rod position voltage signal and converting the rod position voltage signal to digital rod position data;

(c) determining a rotational speed of the rotating component of the machine;

(d) detecting a full rotation of the rotating component of the machine;

(e) determining a plurality of slope values of the rod position voltage signal based on the digital rod position data, wherein the slope values are calculated on a sample-by-sample basis during the full rotation of the rotating component, each slope value indicating a slope of the rod position voltage signal between adjacent data samples;

(f) within the plurality of slope values, finding multiple ranges of consecutive slope values in which each slope value is within a predetermined amplitude range about zero slope;

(g) determining a widest range of consecutive slope values within the multiple ranges, wherein the widest range has a largest number of consecutive slope values;

(h) determining a rotation angle of the rotating component corresponding to the widest range determined in step (g);

(i) calculating a trigger angle based on the rotation angle according to:

trigger angle=rotation angle+piston angle, wherein the piston angle is a predetermined stored value; and (j) storing a trigger angle configuration value in a memory device, wherein the trigger angle configuration value corresponds to the trigger angle calculated in step (i).

In some embodiments, step (h) includes determining a midpoint within the widest range determined in step (g), and determining the rotation angle corresponding to the midpoint.

In some embodiments, the widest range determined in step (g) has a start slope value and an end slope value, wherein the start slope value corresponds to a start angle or a start time, wherein the end slope value corresponds to an end angle or an end time, and wherein the rotation angle corresponds to a midpoint angle between the start angle and the end angle, or corresponds to a midpoint time between the start time and the end time.

In some embodiments, the method includes continuously monitoring rod drop of the piston rod in a triggered mode based on a rod position voltage determined at the trigger angle calculated in step (i).

In some embodiments, the method includes displaying the trigger angle calculated in step (i) for viewing by a user, and receiving input from the user to select:
- the trigger angle configuration value corresponding to the trigger angle calculated in step (i); or
- a predetermined trigger angle configuration value stored in the memory device.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
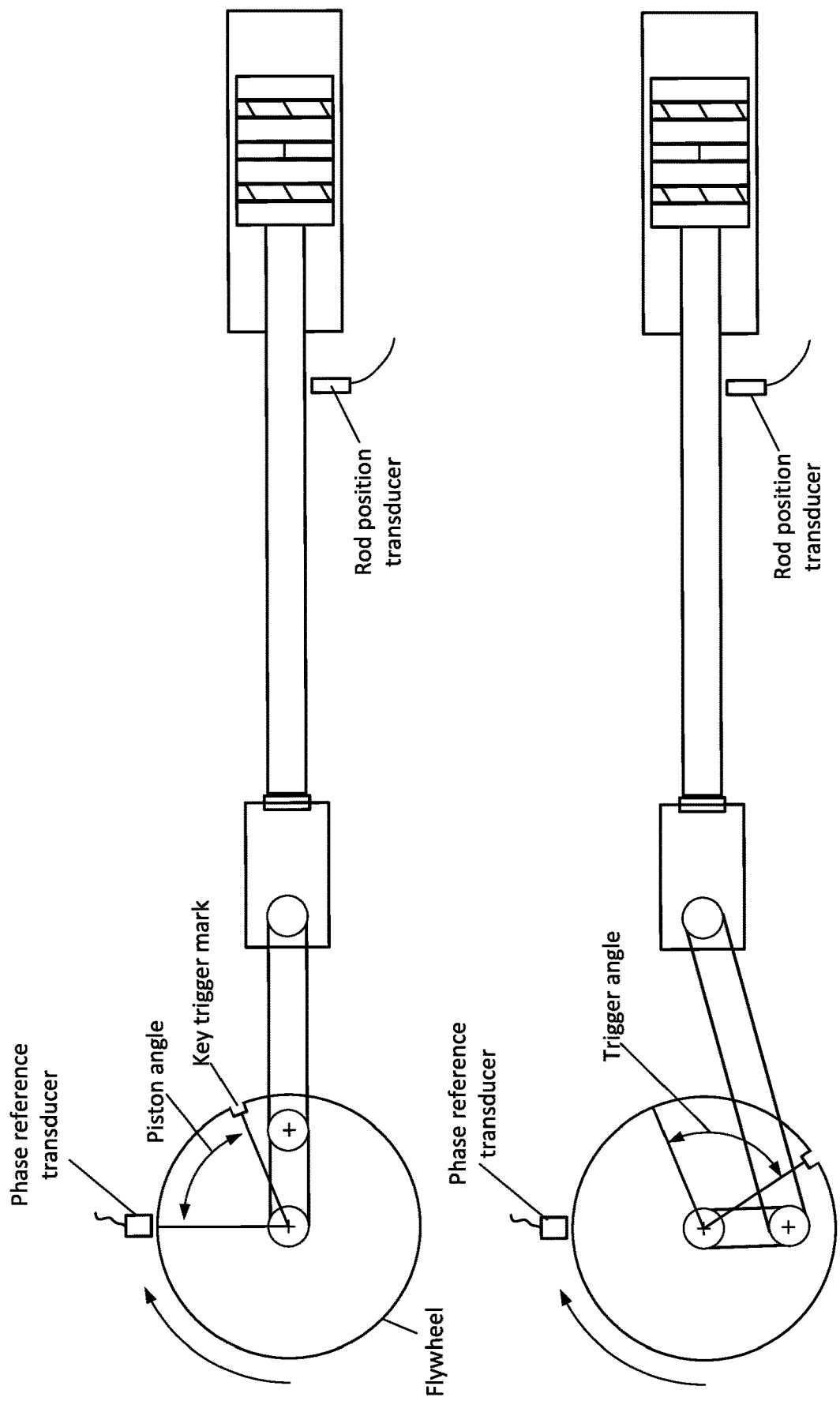
FIG. 1 depicts exemplary positions of a phase reference transducer and rod drop position transducer relative to a flywheel, piston rod and crank shaft of a machine, such as a reciprocating compressor, according to an embodiment of the invention.
Figure 2:
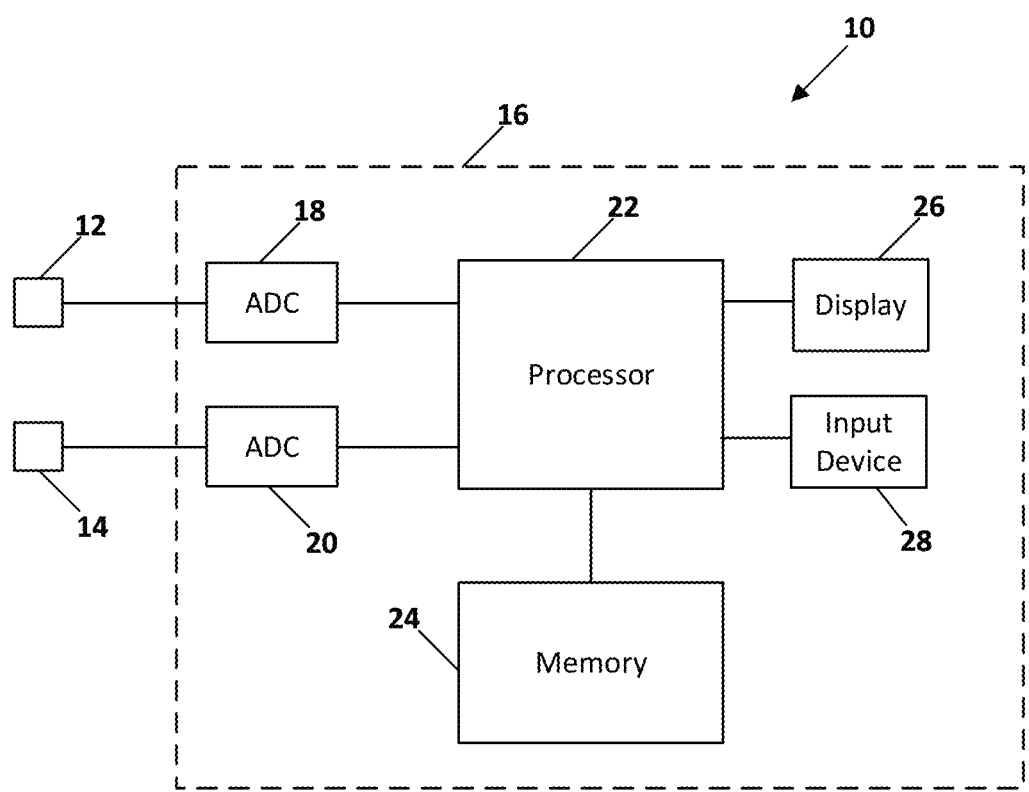
FIG. 2 depicts a machine monitoring system according to an embodiment of the invention.

FIG. 2 depicts an exemplary machine monitoring system 10 for automatically determining an optimal trigger angle of a rotating machine, such as a reciprocating compressor, and setting the appropriate configuration value for the trigger angle. In the embodiment depicted in FIG. 2, a rod position sensor 12, such as a proximity transducer, is mounted vertically (90-degree angle) under or above the piston rod, as close as possible to the compressor cylinder. The sensor 12 generates a voltage signal indicating the vertical range of movement of the piston rod relative to the sensor 12 during continuous operation of the compressor.

A key phase sensor 14, which may be an eddy current proximity transducer, a Hall-effect sensor, an optical pickup or a magnetic pickup, is mounted in close proximity to the flywheel. The sensor 14 is positioned such that, once during each rotation of the flywheel, it will detect a keyway mark, such as an elongated notch, inscribed on the flywheel. The sensor 14 generates a key phase voltage signal having pulses corresponding to each detection of the keyway as the flywheel rotates. It should be appreciated that the key phase voltage signal may also be generated by an additional/separate monitor circuit, and it may be provided as an analog or digital signal. Thus, embodiments of the invention are not limited to any particular source or format of the key phase voltage signal.

The rod drop voltage signal and key phase voltage signal are provided to a rod drop monitor card 16 that preferably includes analog-to-digital converters (ADC) 18 and 20 for sampling the rod drop and key phase voltage signals, a computer processor 22 for processing the rod drop and key phase voltage data, memory 24 for buffering the rod drop and key phase voltage data and storing a trigger angle configuration value, a display device 26 for displaying information related to the trigger angle measurement and configuration process, and an input device 28 for receiving configuration information from a user. In some embodiments, the key phase voltage data may be provided on a separate digital data input.

In some embodiments, the machine monitoring system 10 may include other cards in addition to the rod drop monitor card 16, each having circuitry for monitoring other aspects of a machine. In other embodiments, the machine monitoring system 10 may be a standalone device for monitoring piston rod drop, such as a portable handheld data collector or a permanently or temporarily mounted monitoring device.

Figure 3:
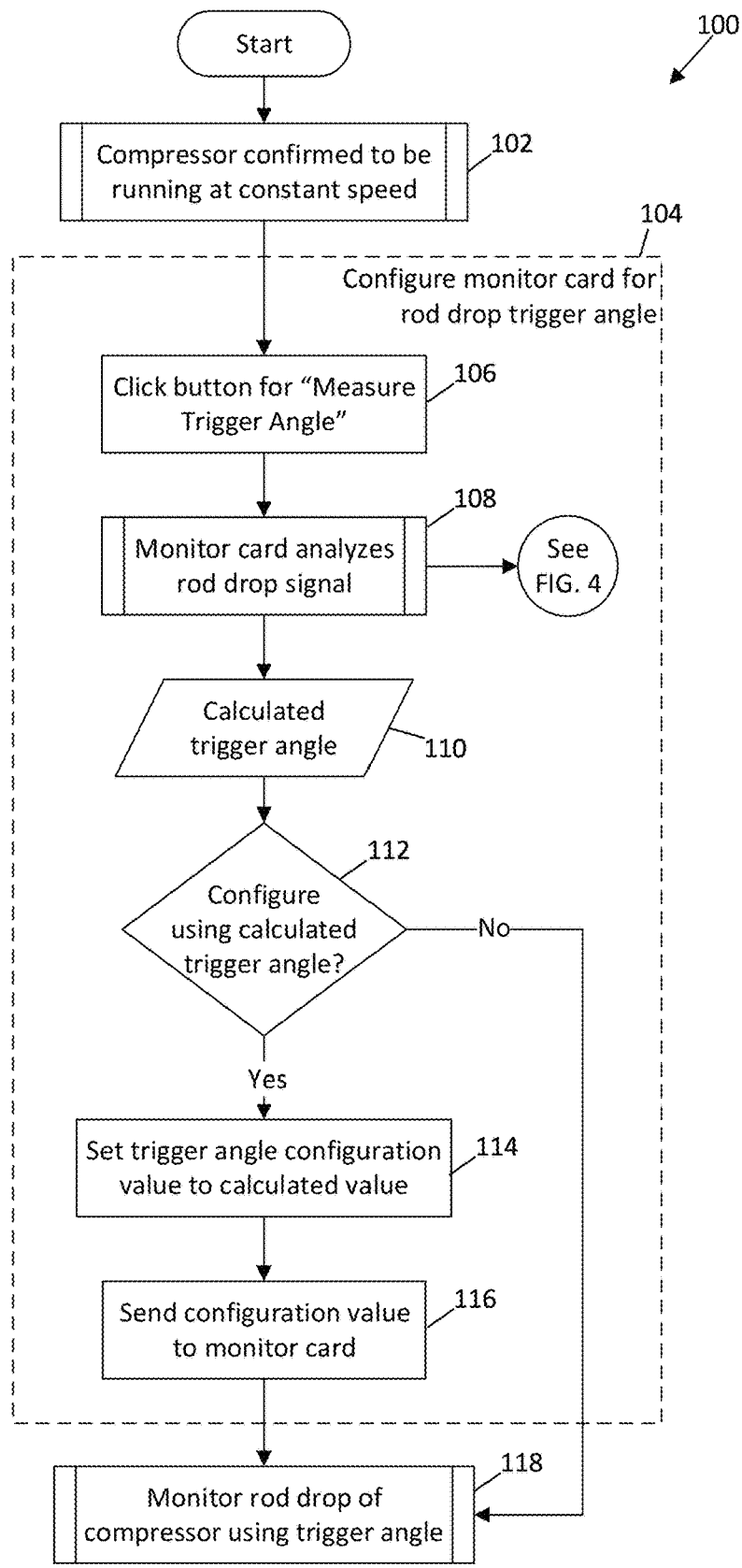
FIG. 3 depicts a first part of a process performed by a machine monitoring system according to an embodiment of the invention.
Figure 4:
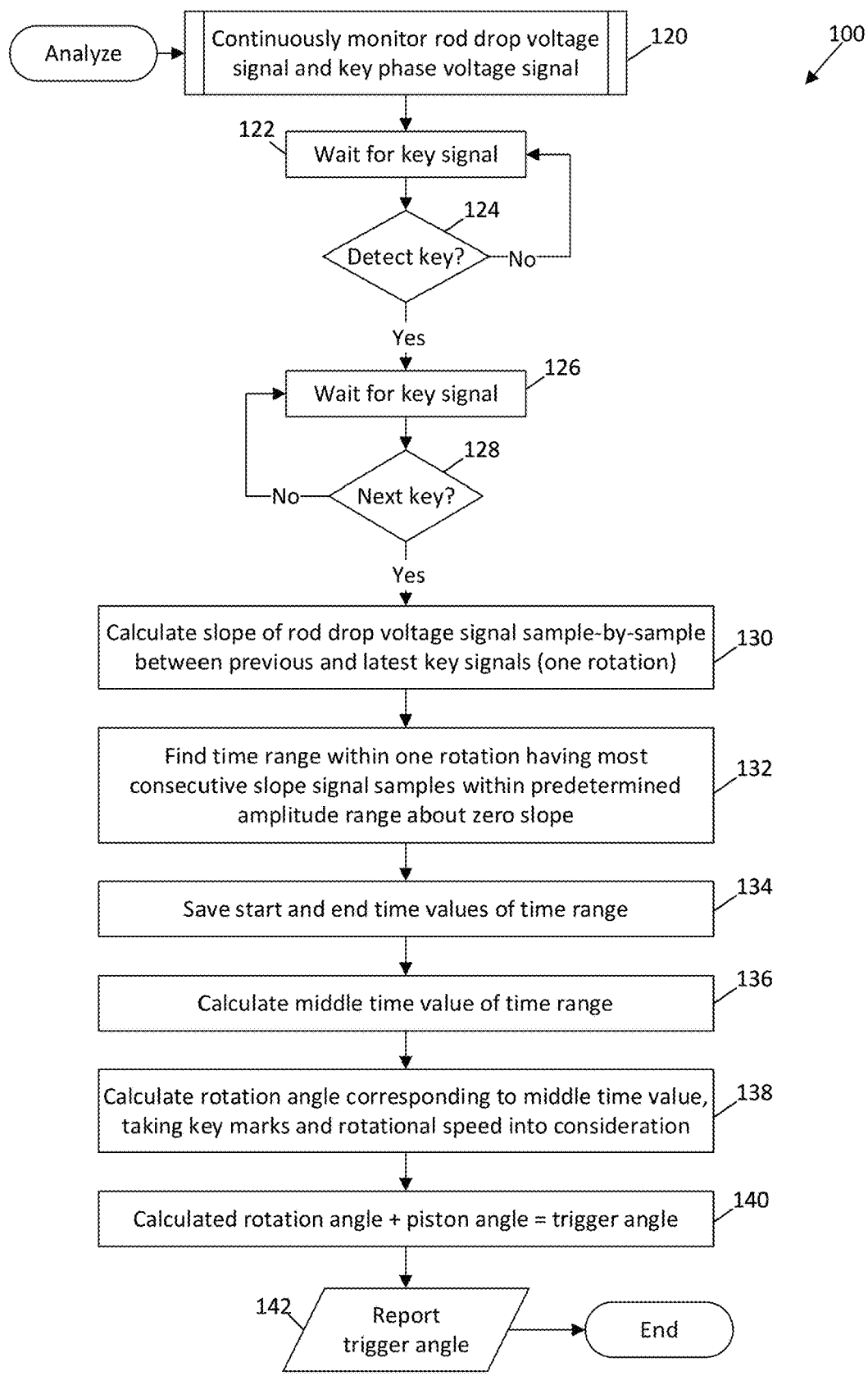
FIG. 4 depicts a second part of a process performed by a machine monitoring system according to an embodiment of the invention.

FIGS. 3 and 4 depict a preferred embodiment of a process 100 for determining an optimal trigger angle configuration value based on rod drop voltage data and key phase voltage data, such as data collected using the exemplary system 10 depicted in FIG. 2. With reference to FIG. 3, after the compressor has been confirmed to be running at a constant operational speed (step 102), the system 10 begins a process to configure the monitor card 16 with predetermined values to be used in monitoring rod drop (step 104). As discussed previously, one of these predetermined values is the trigger angle. In a preferred embodiment, the user clicks a button on the display 26 to initiate the trigger angle measurement routine (step 106), at which point the processor 22 of the monitor card 16 begins an analysis of the rod drop voltage signal data to automatically calculate the trigger angle (step 108). That analysis is detailed in FIG. 4.

Figure 5:
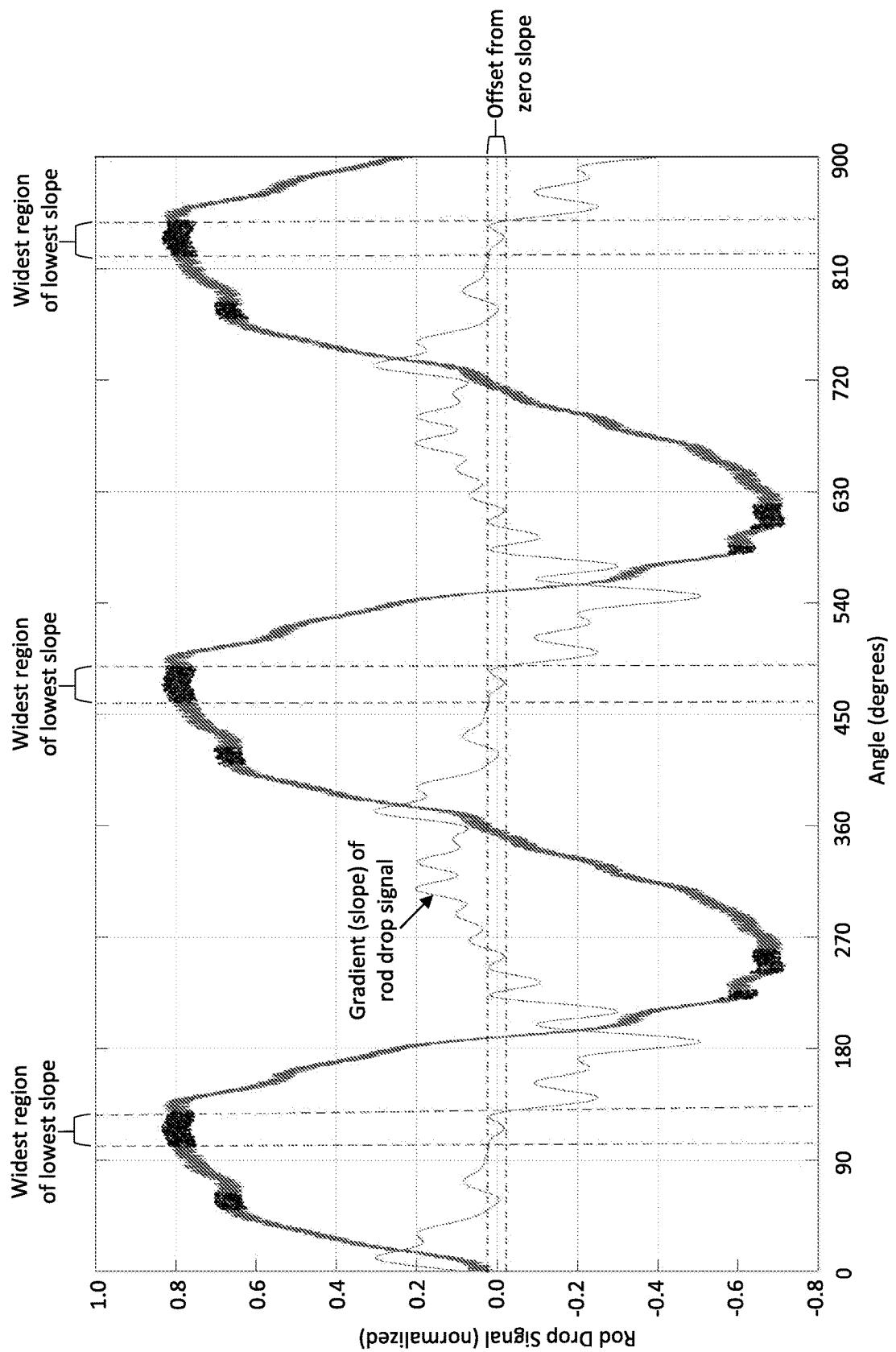
FIG. 5 depicts an exemplary plot of a rod drop voltage signal versus flywheel rotation angle according to an embodiment of the invention.

With reference to FIG. 4, the processor 22 of the monitor card 16 continuously monitors the rod drop voltage and key phase voltage (step 120). Based on the key phase voltage, a full rotation of the flywheel is indicated by two consecutive detections of the keyway (steps 122-128). An exemplary plot of rod drop voltage amplitude versus rotation angle of the flywheel through 2½ rotations is depicted in FIG. 5. The large and generally sinusoidal signal having a period of about 360 degrees is the normalized rod drop voltage. The other signal in FIG. 5 is the slope (mathematical derivative) of the rod drop voltage signal as calculated by the processor 22 (step 130 in FIG. 4). The processor 22 analyzes the slope signal to find a time range within one rotation wherein the most consecutive values of the slope signal are within a predetermined amplitude range about zero (step 132). The start and end times of the time range found in step 132 are saved (step 134), and a midpoint time within that time range is calculated (step 136). Based on the timing of the two consecutive detections of the keyways (steps 124-128) and the known rotational speed of the flywheel, the processor 22 calculates a rotation angle associated with the midpoint time (step 138). The known piston angle value is then added to the rotation angle value calculated in step 138 to determine the trigger angle (step 140). This trigger angle value is returned at step 110 in FIG. 3.

Referring again to FIG. 3, the calculated trigger angle value is displayed on the display device 26 and the user is given the option of accepting the calculated value for configuration purposes or using a previously-stored configuration value for the trigger angle (step 112). If the user selects to use the calculated value, the trigger angle configuration value is set to the calculated value (step 114) and the configuration value is sent to the memory 24 of the monitor card 16 (step 116). The monitor card 16 then monitors and analyzes the rod drop signal using the calculated trigger angle configuration value (step 118). If the user selects not to use the calculated value, the monitor card 16 monitors and analyzes the rod drop signal using the previously-stored trigger angle configuration value.

In some embodiments, the process depicted in FIGS. 3 and 4 and described herein may be automatically executed on a periodic or scheduled basis by the monitor card 16 to recalculate the trigger angle and update the trigger angle configuration value. This eliminates the need for periodic manual reconfigurations.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A machine monitoring system for acquiring information regarding operation of a machine having a piston rod and a rotating component to which the piston rod is connected, the system comprising:
   a rod position sensor mounted adjacent to the piston rod, the rod position sensor generating a rod position voltage signal indicative of proximity of the piston rod relative to the rod position sensor during operation of the machine; and
   a rod position monitor circuit in communication with the rod position sensor, the rod position monitor circuit comprising:
   one or more analog-to-digital converters for sampling the rod position voltage signal and for converting the rod position voltage signal to digital rod position data; and
   a processor operable to execute operational instructions for processing the digital rod position data, the operational instructions comprising instructions which, when executed:
   determine a rotational speed of the rotating component of the machine;

detect a full rotation of the rotating component of the machine;

determine a plurality of slope values of the rod position voltage signal based on the digital rod position data, wherein the slope values are calculated on a sample-by-sample basis during the full rotation of the rotating component, each slope value indicating a slope of the rod position voltage signal between adjacent data samples;

within the plurality of slope values, find slope values that are consecutive in time and have amplitudes that are within a predetermined amplitude range about zero slope;

determine a time range during the full rotation of the rotating component having the most slope values that are consecutive in time and have amplitudes that are within the predetermined amplitude range about zero slope;

determine a rotation angle of the rotating component corresponding to the time range; and calculate a trigger angle based on the rotation angle according to:

trigger angle=rotation angle+piston angle, wherein the piston angle is a predetermined stored value; and memory for storing a trigger angle configuration value corresponding to the trigger angle calculated by the processor.

2. The machine monitoring system of claim 1 wherein the processor determines a midpoint within the time range, and determines the rotation angle corresponding to the midpoint.

3. The machine monitoring system of claim 2 wherein the slope values during the time range include a start slope value and an end slope value, wherein the start slope value corresponds to a start angle or a start time, wherein the end slope value corresponds to an end angle or an end time, and wherein the rotation angle determined by the processor corresponds to a midpoint angle between the start angle and the end angle, or corresponds to a midpoint time between the start time and the end time.

4. The machine monitoring system of claim 1 wherein, after calculating the trigger angle, the processor continuously monitors rod drop of the piston rod in a triggered mode based on a rod position voltage determined at the calculated trigger angle.

5. The machine monitoring system of claim 1 further comprising:

a display device for displaying the calculated trigger angle for viewing by a user; and an input device for receiving input from the user to select:
the trigger angle configuration value corresponding to the trigger angle calculated by the processor; or
a predetermined trigger angle configuration value stored in the memory.

6. The machine monitoring system of claim 1 wherein the rod position sensor comprises a proximity transducer mounted adjacent to the piston rod.

7. The machine monitoring system of claim 1 further comprising a key phase sensor mounted in proximity to the rotating component, the key phase sensor generating a key phase voltage signal having pulses corresponding to rotations of the rotating component.

8. A method for acquiring information regarding operation of a machine having a piston rod and a rotating component to which the piston rod is connected, the method comprising:

(a) generating a rod position voltage signal using a rod position sensor mounted adjacent to the piston rod, wherein the rod position voltage signal is indicative of proximity of the piston rod relative to the rod position sensor during operation of the machine;

(b) sampling the rod position voltage signal and converting the rod position voltage signal to digital rod position data;

(c) determining a rotational speed of the rotating component of the machine;

(d) detecting a full rotation of the rotating component of the machine;

(e) determining a plurality of slope values of the rod position voltage signal based on the digital rod position data, wherein the slope values are calculated on a sample-by-sample basis during the full rotation of the rotating component, each slope value indicating a slope of the rod position voltage signal between adjacent data samples;

(f) within the plurality of slope values, finding slope values that are consecutive in time and have amplitudes that are within a predetermined amplitude range about zero slope;

(g) determining a time range during the full rotation of the rotating component having the most slope values that are consecutive in time and have amplitudes that are within the predetermined amplitude range about zero slope;

(h) determining a rotation angle of the rotating component corresponding to the time range determined in step (g);

(i) calculating a trigger angle based on the rotation angle according to:

trigger angle=rotation angle+piston angle, wherein the piston angle is a predetermined stored value; and (j) storing a trigger angle configuration value in a memory device, wherein the trigger angle configuration value corresponds to the trigger angle calculated in step (i).

9. The method of claim 8 wherein step (h) includes determining a midpoint within the time range determined in step (g), and determining the rotation angle corresponding to the midpoint.

10. The method of claim 9 wherein the slope values during of the time range include a start slope value and an end slope value, wherein the start slope value corresponds to a start angle or a start time, wherein the end slope value corresponds to an end angle or an end time, and wherein the rotation angle corresponds to a midpoint angle between the start angle and the end angle, or corresponds to a midpoint time between the start time and the end time.

11. The method of claim 8 further comprising continuously monitoring rod drop of the piston rod in a triggered mode based on a rod position voltage determined at the trigger angle calculated in step (i).

12. The method of claim 8 further comprising displaying the trigger angle calculated in step (i) for viewing by a user, and receiving input from the user to select:
the trigger angle configuration value corresponding to the trigger angle calculated in step (i); or
a predetermined trigger angle configuration value stored in the memory device.

* * * * *